(12) United States Patent
Mitchell et al.

(10) Patent No.: US 7,495,349 B2
(45) Date of Patent: Feb. 24, 2009

(54) SELF ALIGNING ELECTRODE

(75) Inventors: Porter Mitchell, San Diego, CA (US); Xiaomei Xi, Carlsbad, CA (US); Linda Zhong, San Diego, CA (US); Bin Zou, Chandler, AZ (US)

(73) Assignee: Maxwell Technologies, Inc., San Diego, CA (US)

( * ) Notice: Subject to any disclaimer, the term of this patent is extended or adjusted under 35 U.S.C. 154(b) by 521 days.

(21) Appl. No.: 10/900,630

(22) Filed: Jul. 28, 2004

(65) Prior Publication Data

US 2006/0148191 A1    Jul. 6, 2006

Related U.S. Application Data

(60) Provisional application No. 60/512,802, filed on Oct. 20, 2003, provisional application No. 60/546,093, filed on Feb. 19, 2004.

(51) Int. Cl.
*H01L 27/108* (2006.01)
(52) U.S. Cl. .................. 257/906; 29/25.01; 361/502
(58) Field of Classification Search ............ 257/906, 257/924; 29/25.01, 25.02, 25.03; 361/502, 361/504
See application file for complete search history.

(56) References Cited

U.S. PATENT DOCUMENTS

| | | | |
|---|---|---|---|
| 2,692,210 A | 10/1954 | Burnham | |
| 3,528,955 A | 9/1970 | Lippman et al. | |
| 3,864,124 A | 2/1975 | Breton et al. | |
| 4,129,633 A | 12/1978 | Biddick | |
| 4,153,661 A | 5/1979 | Ree et al. | |
| 4,175,055 A | 11/1979 | Goller et al. | |
| 4,177,159 A | 12/1979 | Singer | |
| 4,194,040 A | 3/1980 | Breton et al. | |
| 4,287,232 A | 9/1981 | Goller et al. | |
| 4,313,972 A | 2/1982 | Goller et al. | |
| 4,317,789 A | 3/1982 | Groult et al. | |
| 4,320,184 A * | 3/1982 | Bernstein et al. | 429/217 |
| 4,320,185 A | 3/1982 | Bernstein et al. | |
| 4,336,217 A | 6/1982 | Sauer | |
| 4,354,958 A | 10/1982 | Solomon | |
| 4,383,010 A | 5/1983 | Spaepen | |

(Continued)

FOREIGN PATENT DOCUMENTS

EP    0617441 A1    9/1994

(Continued)

*Primary Examiner*—Phuc T Dang
(74) *Attorney, Agent, or Firm*—Hensley Kim & Holzer, LLC

(57) ABSTRACT

Electrodes are constructed with pressure-bonding techniques that simplify alignment of various electrode components during lamination. In an exemplary embodiment, a current collector is made from aluminum foil that has been roughed or pitted on both surfaces. The surfaces of the current collector can be further treated to enhance adhesion properties of these surfaces. Layers of film that include active electrode material, such as activated carbon particles, are fabricated using non-lubricated techniques. Each film is coated on one side with an adhesive binder solution, such as a thermoplastic solution. The adhesive binder is dried, and the films are laminated to the current collector using a calender with heated rollers. The resulting electrode product is processed to shape electrodes, which can then be used in electrical energy storage devices, including double layer capacitors.

32 Claims, 4 Drawing Sheets

U.S. PATENT DOCUMENTS

| | | | |
|---|---|---|---|
| 4,482,931 A * | 11/1984 | Yializis | 361/273 |
| 4,500,647 A | 2/1985 | Solomon et al. | |
| 4,556,618 A | 12/1985 | Shia | |
| 4,737,889 A | 4/1988 | Nishino et al. | |
| 4,758,473 A | 7/1988 | Herscovici et al. | |
| 4,822,701 A | 4/1989 | Ballard et al. | |
| 4,877,694 A * | 10/1989 | Solomon et al. | 429/27 |
| 4,895,775 A | 1/1990 | Kato et al. | |
| 4,917,309 A | 4/1990 | Zander et al. | |
| 4,992,910 A | 2/1991 | Evans | |
| 5,100,747 A | 3/1992 | Hayashida et al. | |
| 5,136,474 A | 8/1992 | Sarangapani et al. | |
| 5,150,283 A | 9/1992 | Yoshida et al. | |
| 5,162,178 A | 11/1992 | Ohsawa et al. | |
| 5,168,019 A | 12/1992 | Sugeno | |
| 5,198,313 A | 3/1993 | Juergens | |
| 5,214,564 A | 5/1993 | Metzler et al. | |
| 5,381,303 A * | 1/1995 | Yoshida et al. | 361/502 |
| 5,393,617 A | 2/1995 | Klein | |
| 5,436,093 A | 7/1995 | Huang et al. | |
| 5,450,279 A | 9/1995 | Yoshida et al. | |
| 5,456,000 A | 10/1995 | Gozdz et al. | |
| 5,470,357 A | 11/1995 | Schmutz et al. | |
| 5,478,363 A | 12/1995 | Klein | |
| 5,478,668 A | 12/1995 | Gozdz et al. | |
| 5,482,906 A | 1/1996 | Sakai et al. | |
| 5,557,497 A | 9/1996 | Ivanov et al. | |
| 5,593,462 A | 1/1997 | Gueguen et al. | |
| 5,621,607 A | 4/1997 | Farahmandi et al. | |
| 5,636,437 A * | 6/1997 | Kaschmitter et al. | 29/825 |
| 5,682,288 A | 10/1997 | Wahni | |
| 5,698,342 A | 12/1997 | Klein | |
| 5,706,165 A | 1/1998 | Saito et al. | |
| 5,707,763 A | 1/1998 | Shimizu et al. | |
| 5,720,780 A | 2/1998 | Liu et al. | |
| 5,778,515 A | 7/1998 | Menon | |
| 5,786,555 A | 7/1998 | Saito et al. | |
| 5,786,980 A | 7/1998 | Evans | |
| 5,840,087 A | 11/1998 | Gozdz et al. | |
| 5,846,675 A | 12/1998 | Sazhin et al. | |
| 5,849,431 A | 12/1998 | Kita et al. | |
| 5,879,836 A | 3/1999 | Ikeda et al. | |
| 5,914,019 A * | 6/1999 | Dodgson et al. | 204/415 |
| 5,955,215 A | 9/1999 | Kurzweil et al. | |
| 5,973,912 A | 10/1999 | Kibi et al. | |
| 6,022,436 A | 2/2000 | Koslow et al. | |
| 6,024,773 A | 2/2000 | Inuzuka et al. | |
| 6,031,712 A * | 2/2000 | Kurihara et al. | 361/502 |
| 6,072,692 A * | 6/2000 | Hiratsuka et al. | 361/502 |
| 6,094,338 A | 7/2000 | Hirahara et al. | |
| 6,110,335 A | 8/2000 | Avarbz et al. | |
| 6,114,835 A | 9/2000 | Price | |
| 6,127,474 A | 10/2000 | Andelman | |
| 6,134,760 A * | 10/2000 | Mushiake et al. | 29/25.03 |
| 6,159,611 A * | 12/2000 | Lee et al. | 428/473.5 |
| 6,181,545 B1 | 1/2001 | Amatucci et al. | |
| 6,187,061 B1 | 2/2001 | Amatucci et al. | |
| 6,207,251 B1 | 3/2001 | Balsimo et al. | |
| 6,222,715 B1 | 4/2001 | Gruhn | |
| 6,225,733 B1 | 5/2001 | Gadkaree et al. | |
| 6,236,560 B1 | 5/2001 | Ikeda et al. | |
| 6,238,818 B1 | 5/2001 | Dalton | |
| 6,245,464 B1 | 6/2001 | Spillman et al. | |
| 6,259,595 B1 | 7/2001 | Hebel et al. | |
| 6,262,360 B1 | 7/2001 | Michel | |
| 6,301,092 B1 | 10/2001 | Hata et al. | |
| 6,304,426 B1 | 10/2001 | Wei et al. | |
| 6,308,405 B1 | 10/2001 | Takamatsu et al. | |
| 6,310,756 B1 | 10/2001 | Miura et al. | |
| 6,323,750 B1 | 11/2001 | Lampl et al. | |
| 6,349,027 B1 | 2/2002 | Suhara et al. | |
| 6,359,769 B1 | 3/2002 | Mushiake et al. | |
| 6,377,441 B1 | 4/2002 | Ohya et al. | |
| 6,403,257 B1 | 6/2002 | Christian et al. | |
| 6,424,514 B1 | 7/2002 | Boy et al. | |
| 6,447,669 B1 | 9/2002 | Lain | |
| 6,459,564 B1 | 10/2002 | Watanabe et al. | |
| 6,493,210 B2 * | 12/2002 | Nonaka et al. | 361/502 |
| 6,558,835 B1 | 5/2003 | Kurisu et al. | |
| 6,589,299 B2 | 7/2003 | Missling et al. | |
| 6,614,646 B2 | 9/2003 | Bogaki et al. | |
| 6,627,252 B1 | 9/2003 | Nanjundiah et al. | |
| 6,645,664 B2 | 11/2003 | Nakanishi et al. | |
| 6,677,078 B2 | 1/2004 | Reise et al. | |
| 6,697,249 B2 | 2/2004 | Maletin et al. | |
| 6,708,757 B2 | 3/2004 | Hebel et al. | |
| 6,761,744 B1 | 7/2004 | Tsukamoto et al. | |
| 6,795,297 B2 | 9/2004 | Iwaida et al. | |
| 6,804,108 B2 | 10/2004 | Nanjundiah et al. | |
| 6,808,845 B1 * | 10/2004 | Nonaka et al. | 429/213 |
| 6,831,826 B2 | 12/2004 | Iwaida et al. | |
| 6,841,594 B2 | 1/2005 | Jones et al. | |
| 6,847,517 B2 | 1/2005 | Iwaida et al. | |
| 6,906,911 B2 | 6/2005 | Ikeda et al. | |
| 6,912,116 B2 | 6/2005 | Takahashi et al. | |
| 6,918,991 B2 | 7/2005 | Chickering, III et al. | |
| 7,018,568 B2 * | 3/2006 | Tierney | 252/511 |
| 7,090,946 B2 | 8/2006 | Mitchell et al. | |
| 7,139,162 B2 | 11/2006 | Michel et al. | |
| 7,295,423 B1 | 11/2007 | Mitchell et al. | |
| 2001/0014420 A1 | 8/2001 | Takeuchi et al. | |
| 2002/0008956 A1 | 1/2002 | Niu | |
| 2002/0039275 A1 | 4/2002 | Takeuchi et al. | |
| 2002/0096661 A1 | 7/2002 | Shinozaki et al. | |
| 2002/0122985 A1 | 9/2002 | Sato et al. | |
| 2002/0150812 A1 | 10/2002 | Kaz et al. | |
| 2002/0163773 A1 | 11/2002 | Niori et al. | |
| 2002/0167784 A1 | 11/2002 | Takatami et al. | |
| 2002/0167785 A1 | 11/2002 | Kamath | |
| 2003/0030963 A1 | 2/2003 | Tennent et al. | |
| 2003/0113636 A1 | 6/2003 | Sano et al. | |
| 2003/0157314 A1 | 8/2003 | Penneau et al. | |
| 2003/0175494 A1 | 9/2003 | Penneau et al. | |
| 2003/0180622 A1 | 9/2003 | Tsukude et al. | |
| 2003/0186110 A1 | 10/2003 | Sloop | |
| 2005/0064289 A1 | 3/2005 | Suzuki et al. | |
| 2005/0078432 A1 * | 4/2005 | Gallay et al. | 361/301.3 |
| 2005/0225929 A1 * | 10/2005 | Murakami et al. | 361/502 |
| 2005/0266298 A1 | 12/2005 | Mitchell et al. | |
| 2005/0266990 A1 | 12/2005 | Iwasaki et al. | |
| 2006/0035785 A1 | 2/2006 | Tanaka | |
| 2006/0039100 A1 | 2/2006 | Asano et al. | |
| 2006/0054277 A1 * | 3/2006 | Byun et al. | 156/327 |
| 2006/0105624 A1 | 5/2006 | Yoshikane et al. | |
| 2006/0109608 A1 | 5/2006 | Zhong et al. | |
| 2006/0133012 A1 * | 6/2006 | Zhong et al. | 361/503 |
| 2006/0133013 A1 * | 6/2006 | Xi et al. | 361/517 |
| 2006/0137158 A1 | 6/2006 | Zou et al. | |
| 2006/0143884 A1 | 7/2006 | Mitchell et al. | |
| 2006/0146475 A1 * | 7/2006 | Zhong et al. | 361/301.1 |
| 2006/0146479 A1 * | 7/2006 | Mitchell et al. | 361/502 |
| 2006/0147712 A1 * | 7/2006 | Mitchell et al. | 428/402 |
| 2007/0026317 A1 | 2/2007 | Mitchell et al. | |
| 2007/0177334 A1 | 8/2007 | Thrap | |
| 2007/0184711 A1 | 8/2007 | Thrap et al. | |

FOREIGN PATENT DOCUMENTS

| | | |
|---|---|---|
| EP | 1009058 A1 | 6/2000 |
| EP | 1126536 A2 | 8/2001 |
| JP | 01241811 A | 9/1989 |
| JP | 04067610 A | 3/1992 |
| JP | 04088619 | 3/1992 |
| JP | 05-129020 | 5/1993 |

| | | | | | |
|---|---|---|---|---|---|
| JP | 08-096810 | 4/1996 | WO | 2006135495 | 12/2006 |
| JP | 09183604 A | 7/1997 | | | |
| WO | 2006001847 | 1/2006 | * cited by examiner | | |

SELF ALIGNING ELECTRODE

RELATED APPLICATIONS

This application is related to and claims priority from commonly assigned U.S. Provisional Application Ser. No. 60/512,802, filed 20 Oct. 2003, which is incorporated herein by reference; and This application is related to and claims priority from commonly assigned U.S. Provisional Application Ser. No. 60/546,093, filed 19 Feb. 2004, which is incorporated herein by reference.

FIELD OF THE INVENTION

The present invention relates generally to fabrication of electrodes. More specifically, the invention relates to lamination of active electrode films to current collector during fabrication of electrodes used in electrical energy storage devices, such as double layer capacitors.

BACKGROUND

Electrodes are widely used to store electrical energy, including primary (non-rechargeable) battery cells, secondary battery cells, fuel cells, and capacitors. Because of various competing performance criteria that need to be considered when designing electrodes, many electrodes are built using two or even more parts with different constituent materials. For example, an electrode can be constructed using a film of active electrode material backed by a current collector. Such electrodes are often used in double layer capacitors, which are also known as electrochemical capacitors, supercapacitors, and ultracapacitors.

In comparison to conventional capacitors, double layer capacitors have high capacitance in relation to their volume and weight. There are two main reasons for this volumetric and weight efficiency. First, the width of the charge separation layers is very small, on the order of nanometers. Second, the electrodes can be made from a porous material, having very large effective area per unit volume, i.e., very large normalized effective surface area. Because capacitance is directly proportional to the electrode area, and inversely proportional to the width of the charge separation layer, the combined effect of the narrow charge separation layer and large surface area results in capacitance that is very high in comparison to that of conventional capacitors with similar physical measurements. High capacitance enables double layer capacitors to receive, store, and release large supplies of electrical energy.

Another important performance parameter of a capacitor is its internal resistance, also known as equivalent series resistance (ESR). Internal resistance limits both charge and discharge rates of a capacitor, because the resistance curtails the current that flows into or out of the capacitor. Maximizing the charge and discharge rates is important in many applications. In automotive applications, for example, a capacitor used as the energy storage element powering a vehicle's engine has to be able to provide high instantaneous power during acceleration, and to receive bursts of power produced by regenerative braking. In internal combustion vehicles, a capacitor can be used to power a vehicle's starter, requiring high power output in relation to the size of the capacitor.

Internal resistance also creates heat during both charge and discharge cycles. Heat causes mechanical stresses and speeds up various chemical reactions, thereby accelerating capacitor aging. Moreover, the energy converted into heat is lost, decreasing the efficiency of the capacitor. It is therefore desirable to reduce internal resistance of capacitors.

Active materials used for electrode construction—activated carbon, for example—usually have rather limited specific conductance. Thus, large contact area may be desired or required to minimize the contact resistance between the electrode's active material and the electrode's terminal. The active material may also be too brittle or otherwise unsuitable for directly connecting to electrical terminals. Additionally, the active electrode material may have a relatively low tensile strength, necessitating the use of a mechanical support element in some applications. For these reasons, electrodes often incorporate current collectors.

A current collector is typically a sheet of conductive material on which the active electrode material is deposited. Aluminum foil is commonly used as the current collector material of an electrode. In one electrode fabrication process, for example, a film that includes activated carbon powder (the active electrode material) is produced, and then attached to a thin aluminum foil using an adhesive binder layer. To improve the quality of the interfacial bond between the film of active electrode material and the current collector, the combination of the film and the current collector is processed in a pressure laminator, for example, a calender or another nip. Presence of the binder layer and the process of high pressure lamination increase the bonding forces between the film and the current collector, and reduce the equivalent series resistance of the resulting energy storage device.

In known electrode fabrication processes, the adhesive binder is generally applied to the collector prior to lamination as a wet coating. The coated current collector and the active electrode film are then brought into contact with each other (i.e., stacked) and laminated. Next, the electrode is dried to eliminate volatile solvents present in the wet adhesive. Because the current collector typically has active electrode films attached on both sides, the lamination process may need to be repeated to attach the second film. Alternatively, the binder can be applied to both sides of the current collector, and the collector and the two active electrode films can be laminated together in one step.

During the lamination process, it is important to achieve good registration between each adhesive binder layer and the corresponding active electrode film, and it is also important to achieve good registration between the two active electrode layers. (In the present context, registration means alignment or physical coincidence in the plane of the current collector.) There are several reasons for having good registration. For example, the bond between the current collector and the film may be weakened if binder is not present between some area of the film and the current collector. Additionally, the interfacial resistance will also increase. By way of another example, some area of the current collector may need to remain accessible for attachment of a terminal or connection to another electrode. To ensure that such clear area exists, the current collector can be made slightly wider than the active electrode film. The difference in the respective widths exceeds the maximum registration error, so that the clear area is available at the required location. Unfortunately, it can be difficult to achieve good registration between the active electrode films and the adhesive binder layers coated on the current collector. It can also be difficult to achieve good registration between the two adhesive binder layers on opposite sides of the current collector. These difficulties often necessitate the use of relatively expensive fabrication equipment.

A need thus exists for methods that facilitate registration of the various electrode elements during fabrication of electrodes with relatively low equivalent series resistance.

Another need exists for electrodes fabricated using these methods. A further need exists for energy storage devices using such electrodes.

SUMMARY

The present invention is directed to electrodes, processes for manufacturing electrodes, and energy storage devices employing such electrodes that satisfy these needs. An exemplary embodiment of the invention herein disclosed is a method of manufacturing an electrode. According to the method, first and second films of active electrode material are provided. The films may be made using a dry (non-lubricated) fibrillation process applied to a blend of activated carbon, conductive carbon, and fibril-forming binder, such as polytetraflouroethylene. A surface of the first film is coated with a first layer of wet adhesive binder, and a surface of the second film is coated with a second layer of the wet adhesive binder. The adhesive binder can be a resin solution, for example, an aqueous or isopropyl alcohol solution of thermoplastic. The binder can also include conduction promoting particles, such as conductive carbon particles.

After coating, the first and the second layers are dried to obtain a first dry binder coating and a second dry binder coating on the first and second film surfaces, respectively. The first and the second films are stacked together with a current collector, for example, aluminum foil. Stacking is performed so that the current collector is disposed between the two films, and each of the opposite surfaces of the current collector touches one of the dry binder layers. The resulting stack is pressure laminated to bond the films to the opposite surfaces of the current collector. Lamination can be performed in a pressure- and gap-controlled calender with heated rollers. After lamination, the laminate can be controllably cooled and collected on a receiving roll.

In another exemplary embodiment, the two films and the current collector are stacked and laminated while the adhesive binder is still wet. The adhesive binder is then dried after lamination.

The resulting laminate can be further processed, for example, shaped into appropriate forms, and then used in an energy storage device, for example, in a double layer capacitor.

In one embodiment, a method of manufacturing an electrode includes providing a first film of active electrode material comprising a first film surface; coating the first film surface with a first layer of wet adhesive binder; and drying the first layer of wet adhesive binder to obtain a first dry binder coating on the first film surface. The step of providing a first film may comprise providing the first film as an electrode material formed by a dry high-shear technique. The method may further comprise providing a current collector comprising a first current collector surface and a second current collector surface; stacking the first film and the current collector so that the first current collector surface is in contact with the first dry binder coating; and laminating the current collector and the first film by pressing the current collector and the first film to cause the first film to bond to the first current collector surface. The method may further comprise providing a second film of active electrode material comprising a second film surface; coating the second film surface with a second layer of wet adhesive binder; drying the second layer of wet adhesive binder on the second film surface to obtain a second dry binder coating on the second film surface; and stacking the second film and the current collector so that the second current collector surface is in contact with the second dry binder coating laminating the current collector and the second film by pressing the current collector and the second film to cause the second film to bond to the second current collector surface. The step of laminating the current collector and the first film and the step of laminating the current collector and the second film may be performed at the same time. The step of providing a first film may comprise providing the first film of active electrode material using a non-lubricated high-shear technique; and the step of providing a second film may comprise providing the second film of active electrode material using a non-lubricated high-shear technique. The step of coating the first film may comprise spray coating the first film surface with the first layer of wet adhesive binder; and the step of coating the second film may comprise spray coating the second film surface with the second layer of wet adhesive binder. The step of coating the first film may comprise using a doctor blade to coat the first film surface with the first layer of wet adhesive binder; and the step of coating the second film may comprise using a doctor blade to coat the second film surface with the second layer of wet adhesive binder. The step of providing a current collector may comprise providing aluminum foil. The method of manufacturing an electrode may further comprise storing the coated first film on a storage roll.

In one embodiment, a method of manufacturing an electrode comprises making a first sheet from active electrode material using a non-lubricated high-shear technique, the active electrode material comprising activated carbon particles, the first sheet comprising a first sheet surface; making a second sheet from the active electrode material using a non-lubricated high-shear technique, the second sheet comprising a second sheet surface; coating the first sheet surface with a first layer of adhesive binder; coating the second sheet surface with a second layer of adhesive binder; providing a current collector comprising a first current collector surface and a second current collector surface; stacking the first sheet, the second sheet, and the current collector so that the first current collector surface is in contact with the first layer of adhesive binder and the second current collector surface is in contact with the second layer of adhesive binder, thereby obtaining a stacked product; and laminating the stacked product by pressing the current collector and the first and second sheets to cause the first sheet to bond to the first current collector surface and the second sheet to bond to the second current collector surface, thereby obtaining a laminated electrode product.

In one embodiment, a double layer capacitor comprises one or more electrode film; a collector; and adhesive means coupled to the one or more electrode film for providing attachment of the one or more electrode film to the collector. In one embodiment, an electrode product comprises at least one electrode film; and an adhesive disposed onto the electrode film. The at least one electrode film may comprise a dry fibrillized blend of carbon particles and binder particles. The at least one electrode film may comprise a blend of carbon particles and binder particles. The carbon particles may comprise activated carbon particles. The binder particles may comprise PTFE particles. The carbon particles may comprise conductive carbon particles. The product may comprise a collector, wherein the collector is attached to the at least one electrode film by the adhesive. The adhesive binder may comprise a resin. The adhesive binder may comprise a thermoplastic. The product may comprise a length of at least 5 meters. The electrode film may be self-supporting. The product may be rolled directly onto a storage roll.

These and other features and aspects of the present invention will be better understood with reference to the following description, drawings, and appended claims.

DETAILED DESCRIPTION

Figure 1:
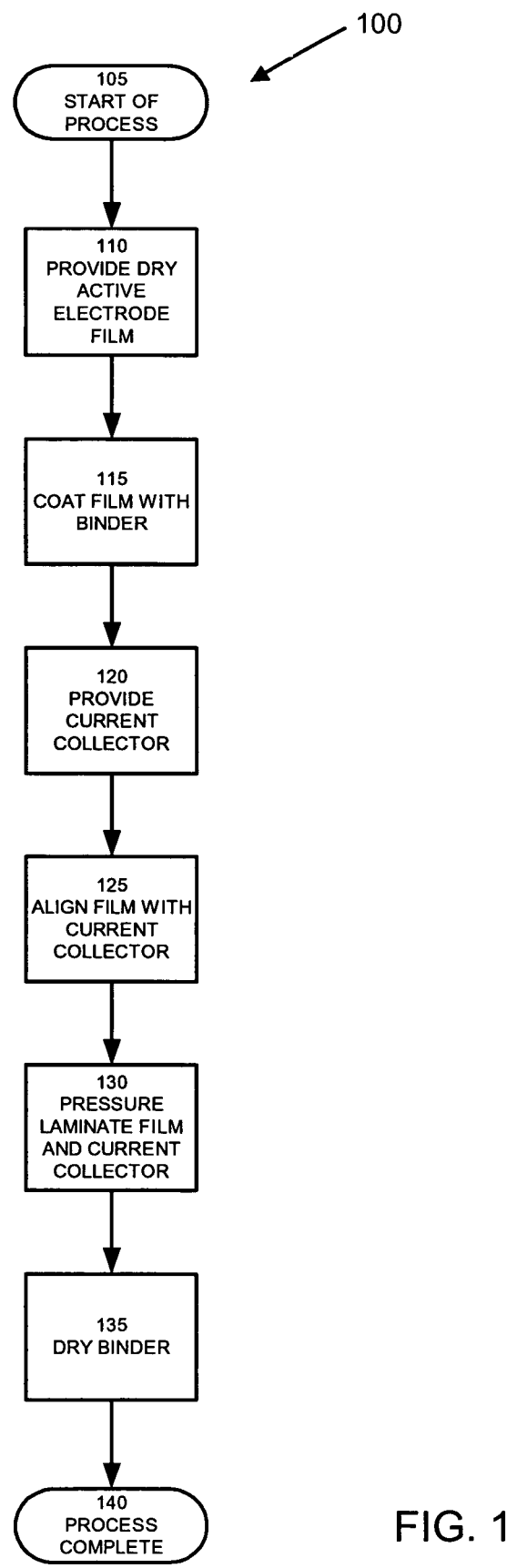
FIG. 1 illustrates selected steps of a process of making an electrode, in accordance with an embodiment of the present invention.

Reference will now be made in detail to several embodiments of the invention that are illustrated in the accompanying drawings. Wherever practicable, same reference numerals are used in the drawings and the description to refer to the same parts. Occasionally, similar numerals are used to refer to like parts in different drawings. The drawings are in a simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner.

In the following description, we sometimes refer to "particles" and materials in "particle form." Such references are not intended to limit the invention, as a person skilled in the relevant art should recognize, particulate material is can also referred to as a powders, grains, flakes, specks, dust, or by other similar or like appellations.

Further note that by "active electrode material," "active electrode film," and similar expressions, we mean a material that enhances the function of an electrode beyond simply providing a contact or reactive area approximately the size of the visible surface of the electrode. In electrodes of double layer capacitors, for example, the active electrode film includes particles with high porosity, so that the surface area of the electrode exposed to an electrolytic solution (in which the electrode is immersed), is increased well beyond the area of the visible surface. The effective surface area of the electrode then becomes essentially a function of the volume of the active electrode film, rather than a function of the visible surface area. Therefore, a film of porous material can be an "active electrode film" in the present context.

Referring more particularly to the drawings, FIG. 1 illustrates selected steps of a process 100 of making an electrode in accordance with an embodiment of the present invention. We provide a brief overview of the process 100 in the next paragraph, and then discuss the individual process steps in more detail further below.

At step 110, a film of dry active electrode material is provided for fabrication of the electrode. At step 115, the film of the active electrode material is coated with adhesive binder on one side. At step 120, a current collector is provided. At steps 125 and 130, the film of active electrode material and the current collector are aligned, brought into contact with each other, and laminated under pressure. At step 135, the adhesive binder is dried.

One or more technique used to manufacture dry film of active electrode material provided in step 110 of the process 100 is disclosed in the following commonly assigned U.S. patent application Ser. No. 10/817,701, entitled DRY PARTICLE BASED ELECTRO-CHEMICAL DEVICE AND METHODS OF MAKING SAME, which is hereby incorporated by reference as if fully set forth herein.

According to techniques of manufacturing the dry film of electrode material, particles of dry activated carbon (the active electrode material) are blended or otherwise dry mixed together with a polymer and with particles of dry conductive carbon (a conduction promoter), to form a dry powder material. The dry powder material is fibrillized using dry non-lubricated high-shear techniques, which in one embodiment comprises jet milling. The high shear forces that arise during the jet mill process physically stretch the polymer particles, causing the polymer to form a network of fibers that bind the polymer to the conduction promoter and to the active electrode material particles, e.g., to the conductive and activated carbon particles. The fibrillized material is then fed into one or more high-pressure nips, such as roll mills, calenders, belt-presses, or flat plate presses. Solvent is not used in this process. The resulting self-supporting film can be made to any desired length, for example, within a length of thousands of meters to meters.

Figure 2:
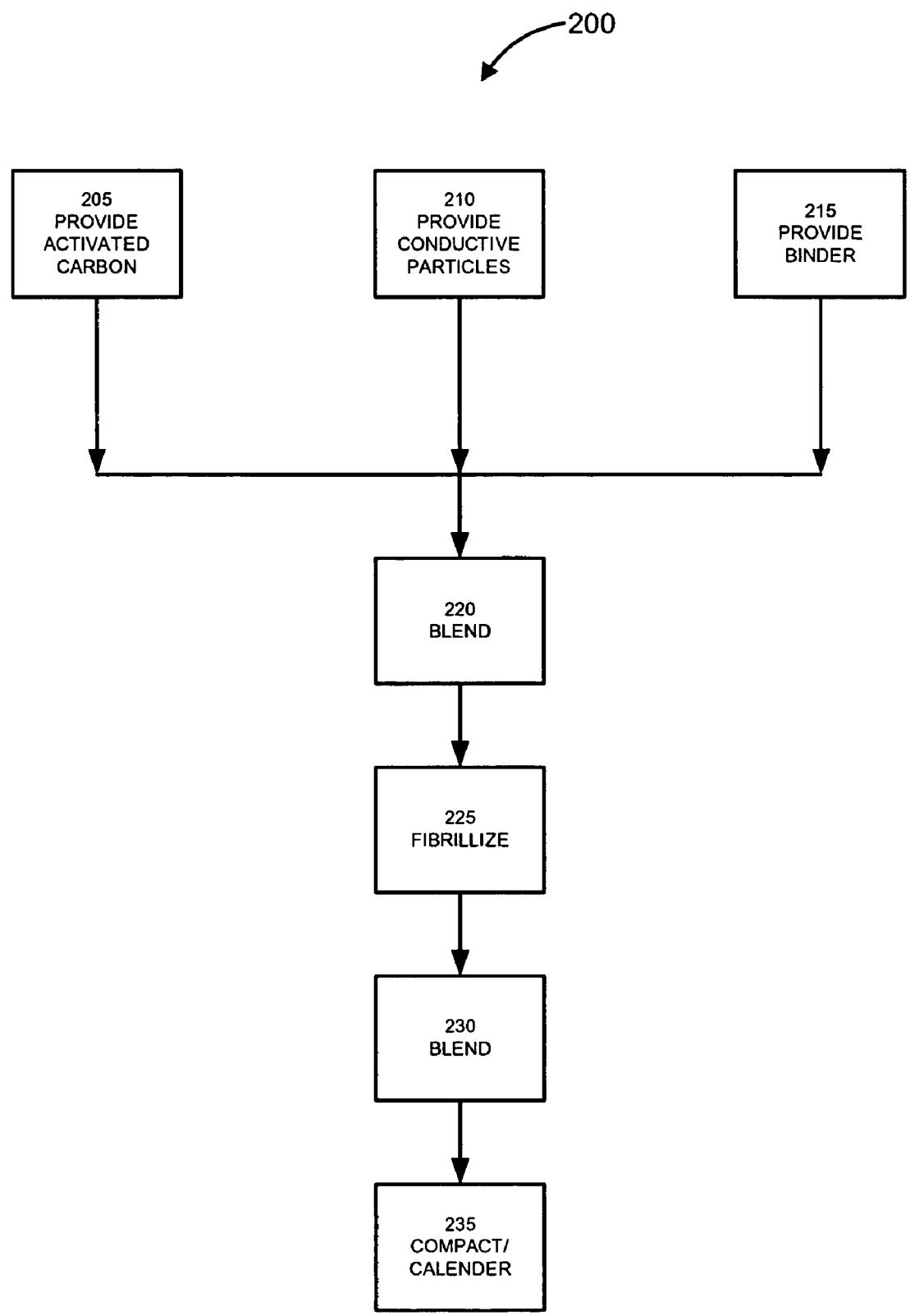
FIG. 2 illustrates selected steps of a process used to manufacture dry film of active electrode material used in the process of making an electrode, in accordance with an embodiment of the present invention.

FIG. 2 illustrates selected steps of such a process 200 used to manufacture the dry film provided in step 110. In this exemplary embodiment, active electrode material is provided in the form of activated carbon particles, in process step 205. Suitable activated carbon powders are available from a variety of sources, including Nuchar® powders sold by Westvaco Corporation, 1 High Ridge Park, Stamford, Conn. 06905; telephone number (203) 461-7400.

Conductive particles are provided in step 210. The conductive particles, for example, graphite or conductive carbon particles, act as a promoter of electrical conduction. In one embodiment, it is envisioned that metal powders or other conductive particles acting as conduction promoters can be substituted for the conductive carbon particles.

At step 215, fibril-forming binder is provided in powder form. In an embodiment, the fibril-forming binder is a fine powder of polytetraflouroethylene (PTFE or Teflon®) with particle diameters in the 500 micron range. The fibril-forming binder substances in other embodiments include polytetraflouroethylene in granular powder form, various fluoropolymer particles, polypropylene, polyethylene, co-polymers, and other polymer blends. Generally, any fibrillizable substance can be used as an adhesive to bind together the particles of the active electrode material.

By way of example, particle mixtures used in accordance with embodiments of the present invention include 50% to 99% of activated carbon, 0% to 25% of conductive carbon, and 0.5% to 50% of binder. More particularly, various embodiments use particle mixtures with between 80% and 93% of activated carbon, between 0% and 15% of conductive carbon, and between 3% and 15% of binder. In still more particular embodiments, the proportions used are as follows: 85% to 90% of activated carbon, 5% to 8% of binder, and 2%-10% of conductive carbon. Here and elsewhere in this document, all mixture percentages are given by weight, unless specifically indicated otherwise.

The carbon and binder particles that have been provided in steps 205, 210, and 215, are dry-blended together, in step 220, forming a dry-blended carbon-binder mixture. In one exemplary process, the carbon and binder particles are blended for 1 to 10 minutes in a suitable blender that agitates the powders over a revolving shaft to form a uniform mixture, using apparatus and methods known to those skilled in the art. In other process embodiments, the blending time varies, depending on batch sizes, blender types, blender settings, the specific composition of the materials, particle sizes of the binder, sizes and size distributions of the carbon agglomerates, specific densities, and other properties of the particles and of the blending machinery.

In some embodiments, the blending step 220 is carried out under controlled temperature conditions. For example, the blended materials are kept at a temperature not exceeding 75 degrees Fahrenheit (24 degrees Celsius) during the blending step 220. Various other methods of mixing dry particles or powders can be employed in the blending step 220, without departing from the spirit and scope of the present invention.

Particle size reduction and classification can be carried out as part of the blending step 220, or prior to the blending step 220. Size reduction and classification may improve consistency and repeatability of the resulting blended mixture and, consequently, of the quality of the electrodes made from the mixture.

In step 225, the blended mixture is dry fibrillized. The step 225 is effectuated using non-lubricated fibrillation in a jet mill, also known as air impact pulverizer. In the course of jet mill fibrillation, jets of dry high velocity air or other gas agent are directed at the particles of the dry blended mixture, applying high-shear forces to the binder within the mixture. Such dry fibrillation does not require addition of a lubricant or solvent to the mixture before, during, or after the fibrillation step 225.

During the fibrillation step 225, the dry binder is physically stretched by the high-shear forces that act upon it. The stretched binder forms a lattice network of thin, web-like fibers that enmesh, entrap, and bind together the activated and conductive carbon particles provided in steps 205 and 210. In one embodiment, the fibrillation step 225 creates a dry particle-based compounded material that exhibits uniform, homogeneous properties.

In step 235, the dry compounded material may be compacted in a compaction device, for example, a calendering apparatus as known to those skilled in the art. In one embodiment, a resulting compacted dry process based electrode film exhibits self-supporting properties that allow it to be readily adapted for later use. In one embodiment, the compacted dry process based electrode film may be stored for later use by rolling it onto a storage roll, or other storage device.

Turning now to step 115 of the process 100 of FIG. 1, the self-supporting properties of the dry process based electrode film enable that the film can be continuously covered on one side with an adhesive binder. In one embodiment, the adhesive binder is applied as a wet adhesive binder. The wet binder coating can be obtained by dissolving a binder in a processing additive, such as organic solvent, aqueous solvent, or a blend of aqueous and organic solvents. In some embodiments, an electrical conduction enhancer is added to the binder solution. The resulting solution typically has a slurry-like composition. In some embodiments, the wet adhesive is coated onto the dry electrode film by spraying using compressed air. In other embodiments, the wet adhesive is coated using a doctor blade or a slot die. In still other embodiments, the wet adhesive is coated using a gravure coating process. The gravure coating process employs a main roller running in a coating bath. Excess coating on the roller is wiped off by a doctor blade, and the coating is deposited onto the active electrode film as the film passes between the main roller and a pressure roller of the gravure coating apparatus. The wet adhesive can also be applied using other techniques known to a person skilled in the relevant art, including reverse roll coating, knife over roll coating (gap coating), metering rod coating, curtain coating, air knife coating, and partial immersion coating.

In certain exemplary embodiments, the solvents used to produce the wet adhesive binder include water, isopropyl alcohol (IPA), and ammonia solutions; the conduction enhancer includes graphite or conductive carbon powder; and the binder includes a thermoplastic powder material.

In various electrode manufacturing process embodiments, the proportions (by weight) of the constituent components of the wet adhesive binder are as follows: between 5 and 20 percent of conductive carbon, between 7 and 40 percent of thermoplastic, and between 40 and 85 percent of solvent. In more specific process embodiments, the proportions are as follows: 7-11 percent of conductive carbon, 12-25 percent of thermoplastic, and 65-80 percent of solvent. In a still more specific process embodiment, the proportions are: about 10 percent graphite, 20 percent thermoplastic, and 70 percent binder. One embodiment uses adhesive coating known by the trade name Electrodag® EB-012, available from Acheson Colloids Company, 1600 Washington Avenue, Port Huron, Mich. 48060; telephone number (810) 984-5581; www.achesonindustries.com. The Electrodag® EB-012 coating is a water-based dispersion of graphite in a thermoplastic binder.

The thickness of the wet adhesive binder layer applied to the active electrode film can vary over a wide range. In one embodiment, the thickness of the binder layer is between about 20 and 30 microns when wet. In addition to the binder remaining on the surface of the film, some binder penetrates the pores of the film. This effect further enhances the interfacial bond between the active electrode film and the current collector, and reduces the interfacial resistance between the film and the collector.

Continuing with the description of the process 100 of FIG. 1, a current collector is provided in step 120. In one embodiment, the current collector is a sheet of aluminum foil approximately 40 microns thick. In some alternative embodiments, the thickness of the foil is between about 20 and about 100 microns; in other, more specific embodiments, the thickness of the aluminum foil is between about 30 and about 50 microns. Other conductive materials can be used in the current collector, including, for example, silver, copper, gold, platinum, palladium, steel, and tantalum, as well as various alloys of these metals. Non-metallic conductive materials are also potential candidates for use in the current collector.

The current collector can be made from a mesh, screen, porous substrate, or the like.

In some embodiments, the surface of the current collector is pretreated to be uneven and rough. Surface roughing can be achieved using, for example, mechanical roughing, or chemical pitting or etching. In addition, the surface of the current collector can be subjected to a surface activation treatment using, for example, corona discharge, active plasma, ultraviolet, laser, or high frequency treatment methods known to a person skilled in the appropriate art. The roughing and activation treatments tend to promote adhesion between the current collector and the films of active electrode material. In some electrode embodiments, the surface activation treatment also performs the function of roughing the surface, or is applied instead of roughing the surface of the current collector.

Figure 3:
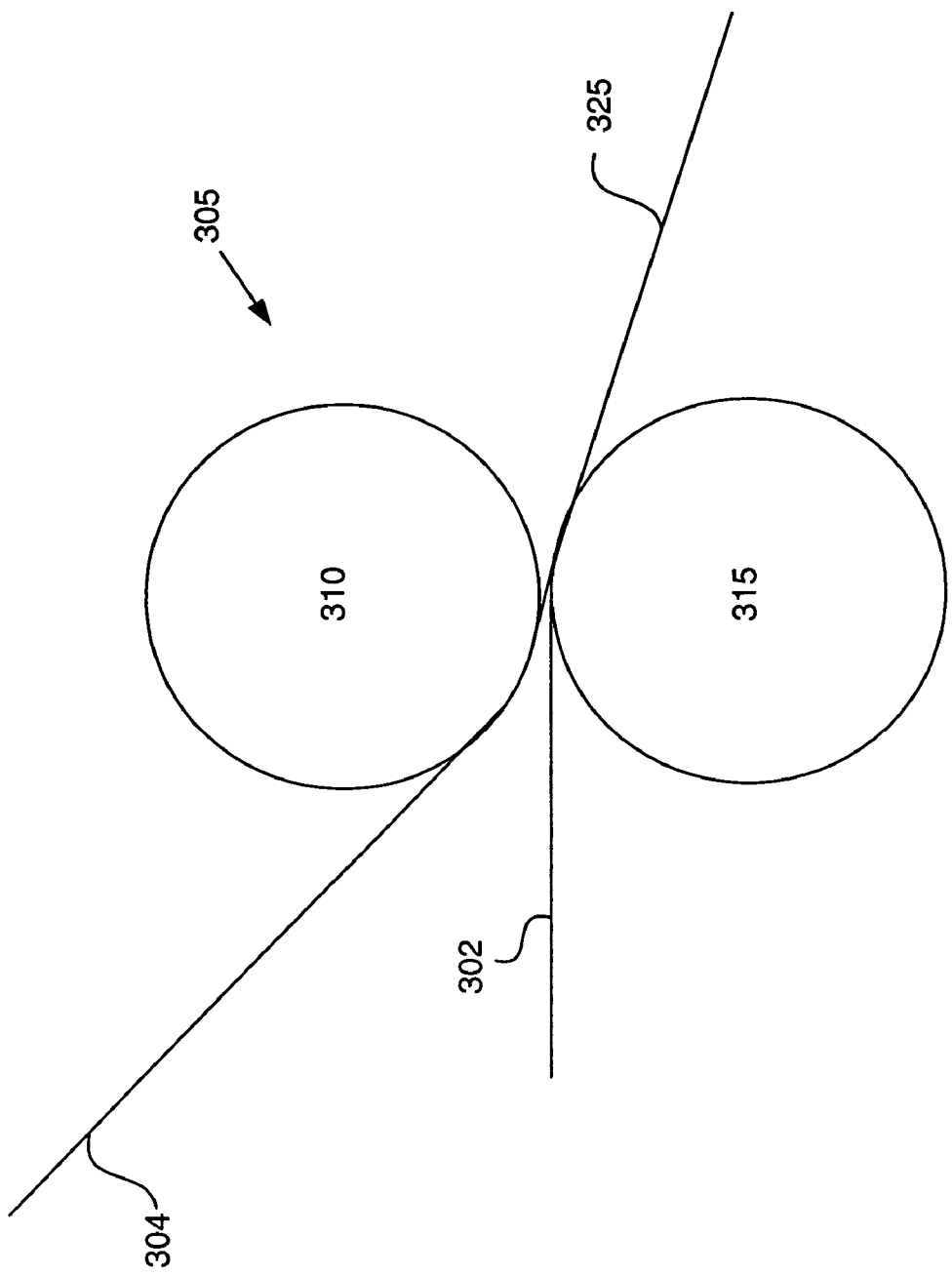
FIG. 3 is a simplified illustration of laminating pre-coated active electrode film to a current collector, to obtain an electrode product, in accordance with an embodiment of the present invention.

In steps 125 and 130 of the process 100, the active electrode film and the current collector are brought into contact with one another, and pressure laminated to bond these component parts to each other. FIG. 3 illustrates these steps in a greatly simplified manner.

Active electrode film 304 and aluminum foil 302 (the current collector) are fed between rollers 310 and 315 of a calender 305. In one embodiment, the film 304 and the foil 302 may be disposed so that the adhesive binder coating (which was applied to the film 304 in step 115) faces a side of the foil 302 that has been roughed and activated. It is identified that because the adhesive binder has been coated onto the film 304, no alignment of the film to a prior art precoated layer of adhesive on the aluminum foil 302 need occur. In this regard, other than a centered alignment of the film 304 to within the boundaries of the foil 302, no further precise alignment of the electrode film 304 need be made, unless so desired. In other words, because no alignment to an adhesive layer need be made, alignment of the film 304 in relation to the foil 302 can be more-or-less self-aligning, or in further words, the film comprises a self aligning adhesive, which results in a large savings of time and money in an embodiment wherein each side of the foil 302 is laminated to a film 304.

In the illustrated embodiment, the calender 305 is a gap-controlled calender, meaning that the gap between the rollers 310 and 315 can be set to a predetermined distance. The calender presses the foil 302 and the film 304 together, bonding these two components into a composite electrode product 325. The pressure applied by the calender can also improve penetration of the adhesive binder coating into the active electrode film 304.

In one embodiment, the thickness of the film 304 is between about 160 and about 180 microns, and the thickness of the foil 302 is about 40 microns. The gap of the calender 305 is set to between about 110 to about 120 microns. Because the aluminum foil 302 is substantially uncompressible, the calender compresses the film 304 of this embodiment by about 50 percent. Coming out of the calender, the film 304 expands, so that a more permanent reduction in its thickness is between about 5 and about 20 percent in some embodiments.

Other processes in accordance with embodiments of the present invention employ pressure-controlled calenders. The pressure applied to the combination of the foil 302 and the film 304 is generally more than about 50 pounds per linear inch (PLI), but less than 2,000 PLI. (One PLI is about 1.75 Newtons per centimeter). More specifically, the pressure applied is between about 500 and 2,000 PLI. Still more specifically, the pressure is set to between about 650 and 900 PLI in some embodiments. In one embodiment, the pressure applied is about 750 PLI.

To improve the bond created between the foil 302 and the film 304, one or both of the rollers 310 and 315 may be heated. In one process embodiment, the roller 315 is heated to about 100 degrees Celsius. In another embodiment, the roller 315 is heated to a temperature between about 100 and 300 degrees Celsius. The roller 310 may be heated to the same temperature as the rollers 315, or to a different temperature.

The speed with which the foil 302 and the film 304 move through the calender 305 may be controlled. In one process embodiment, the calender rollers are about 4 inches (102 millimeters) in diameter, and make about one revolution per minute. In another process embodiment, the rollers turn to cause the composite electrode product 325 to be produced at the output of the calender 305 at the rate of about 10 feet (3 meters) per minute.

Next, the adhesive binder is allowed to dry at or above room temperature to remove the solvent present in the wet adhesive binder. This is done in step 135 of the process 100. Active (force) drying can also be used in this step.

In some embodiments, the adhesive binder layer coated onto the active electrode film may be sufficiently dried before the film is laminated onto the current collector. In one embodiment, the adhesive binder coating can be allowed to air dry at room temperature after the coating step 115. Alternatively, the wet adhesive coating can be force-dried. In the case of Electrodag® EB-012 binder, the manufacturer recommends air-drying at room temperature for 24 hours, or force-drying for 3 to 10 minutes at a temperature between 70 and 90 degrees Celsius. The minimum duration of the drying step 115 may depend not only on the ambient or drying agent temperature, but also on the relative humidity of the air and the thickness of the applied coating. Force-drying is often employed to speed up the manufacturing process and achieve a more uniform, homogeneous dry binder layer. After drying, the coated film can be collected on a roll and stored until it is needed for electrode fabrication.

Figure 4:
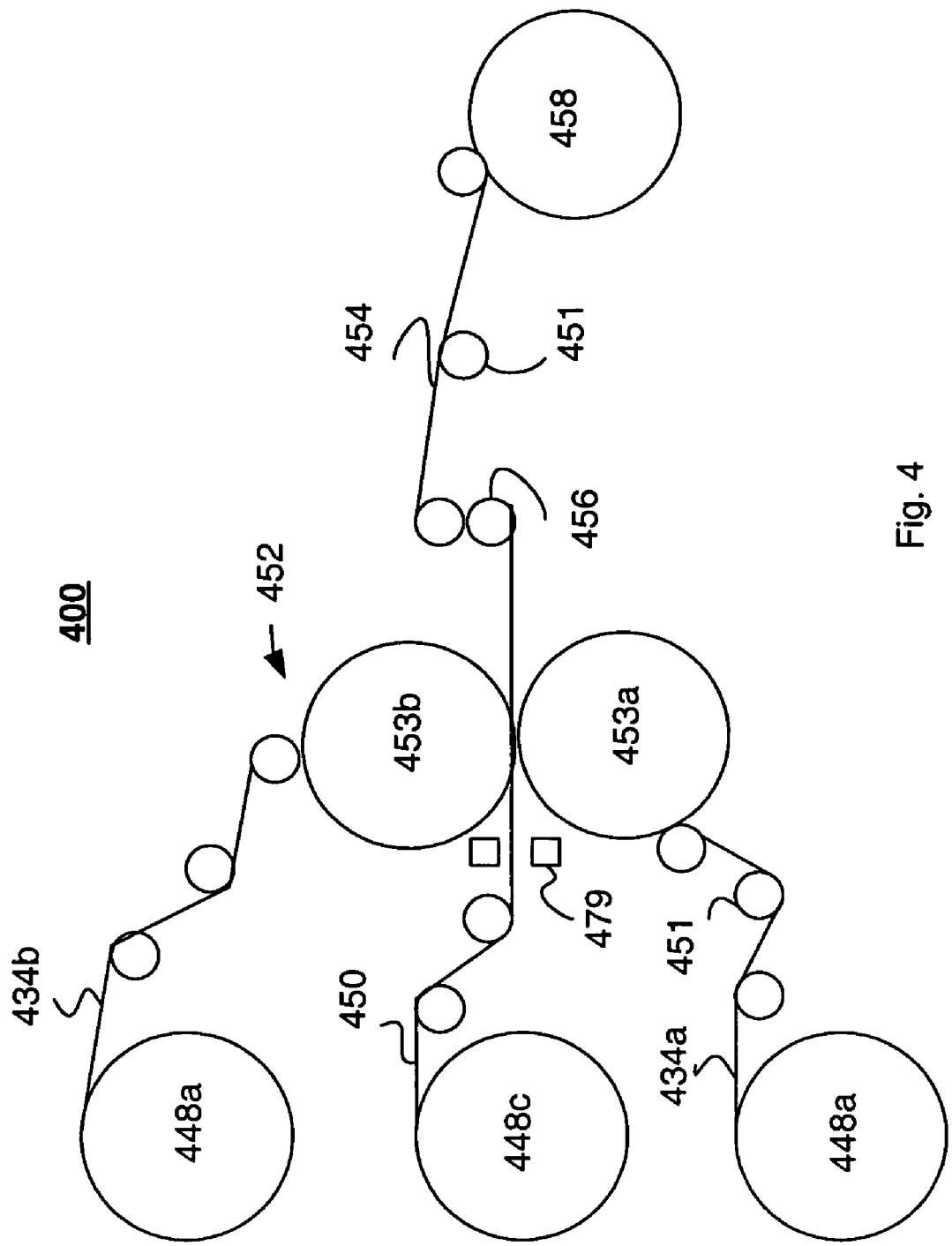
FIG. 4 is a simplified illustration of laminating two pre-coated active electrode films to opposite sides of a current collector, to obtain an electrode product, in accordance with an embodiment of the present invention.

FIG. 4 illustrates, in a simplified manner, a process 400 of bonding two active electrode films 434a and 434b onto opposite sides of an aluminum foil (current collector) 450. Each of the films 434a and 434b was made without the use of solvent, as described above with reference to FIG. 2. Each of the films 434 was coated with an adhesive binder layer and dried. The films 434 were then collected on storage rolls 448a and 448b. Storage roll 448c contains the aluminum foil 450. In one embodiment, the thickness of each film 434 is about 180 microns, while the aluminum foil 450 has a thickness of about 30 microns. The aluminum foil 450 is chemically pitted on both sides to a depth not exceeding about 10 microns. In some embodiments, the thickness of the films 434 varies between about 80 and 350 microns. After the pressure-bonding process illustrated in FIG. 4, the thickness of the films 434 is reduced in relation to their original thickness, because of compressibility of the active electrode material.

In the embodiment of FIG. 4, the aluminum foil 450 and the two active electrode films 434a and 434b are fed from the storage rolls 448 into the laminator 452 so that the aluminum foil 450 is positioned between the coated sides of the films 434a and 434b. The laminator 452 includes rollers 453a and 453b, each having a diameter of about six inches (152 millimeters) and a working surface (width) of about 13 inches (330 millimeters). The rollers 453 rotate so that the films 434 and the current collector 450 are processed at the rate of between about 12 and 120 inches per minute (between 30.5 centimeters and 3.05 meters per minute). The rollers 453 are heated in order to soften the dry binder layers that cover the surfaces of the films 434, effectuating good adhesion of the films 434 to the current collector 450.

In one embodiment, the surface temperature of the rollers 453 at the nip of the laminator 452 is between 100 and 300 degrees Celsius (212 and 572 degrees Fahrenheit). In a more specific embodiment, the surface temperature of the rollers 453 is between 150 and 250 degrees Celsius (302 and 482 degrees Fahrenheit). In a still more specific embodiment, the surface temperature of the rollers is set between 195 and 205 degrees Celsius (383 and 401 degrees Fahrenheit). In some embodiments, the surface temperature of the rollers 453 is selected so as to soften or melt the binder layers coated on the active electrode films 434. To assist in heating the adhesive binder layers, the apparatus illustrated in FIG. 4 may include current collector pre-heaters 479 positioned in front of the rollers 453.

Each film 434 becomes calendared and bonded to a side of the aluminum foil 450, resulting in an electrode product 454 exiting the laminator 452. In one embodiment, the electrode product 454 is S-wrapped over chill rolls 456 to help set the films 434 onto the aluminum foil 450, and to cool the electrode product 454 in a controllable manner. In one embodiment, the chill rolls 456 may be cooled by internal liquid coolant with temperature of about 18 to 22 degrees Celsius (about 64 to 72 degrees Fahrenheit). In a more specific embodiment, the temperature of the liquid coolant may be between about 20 and 21 degrees Celsius (68 to 70 degrees Fahrenheit).

In one embodiment, the nip pressure is set in the range of 50 to 1,000 pounds per linear inch (PLI) of the width of the films 434. In a more specific embodiment, the nip pressure is set in the range of 350 to 650 PLI. In a still more specific embodiment, the nip pressure is set between 450 and 550 PLI. In a particular embodiment, the nip pressure is set to about 500 PLI.

In one embodiment, the gap between the laminator rollers 453a and 453b is set to between 30 and 45 percent of the stack thickness, i.e., to 30-45 percent of the combined thicknesses of the current collector 450 and of the films 434a and 434b with their adhesive binder layers. In a more specific embodiment, the laminator gap is set to between 35 and 40 percent of the stack thickness.

The resulting electrode 454 can be collected onto another storage roll 458 and subsequently used as needed. One or more tension control elements 451 can also be employed by the system shown in FIG. 4, to improve control of the electrode product 454, of the active electrode films 434, and of the aluminum foil 450, before, during, and after processing in the laminator 452.

The electrode product 454 can be further processed and shaped to provide electrodes for use in an energy storage device product, for example, in a double-layer capacitor.

This document describes the inventive electrodes and processes used in the course of their fabrication in considerable detail for illustration purposes only. Neither the specific embodiments of the invention as a whole, nor those of its features limit the general principles underlying the invention. In particular, the invention is not limited to the specific materials used for fabricating the electrodes; and pressure-bonding of the inventive electrodes is not limited to the use of calenders, but includes various other pressure devices. The invention also need not be limited to electrodes of double layer capacitors, but extends to all electrode applications. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their legal equivalents.

We claim:

1. An electrode product, comprising:
   at least one electrode film comprising a dry blend of carbon and binder particles; and
   a self-aligning adhesive disposed onto the electrode film.

2. The product of claim 1, wherein the at least one electrode film comprises a dry fibrillized blend of carbon particles and binder particles.

3. The product of claim 1, wherein the at least one electrode film is formed by applying high shear forces to the dry blend of carbon particles and binder particles.

4. The product of claim 1, wherein the carbon particles comprise activated carbon particles.

5. The product of claim 1, wherein the binder particles comprise PTFE particles.

6. The product of claim 1, wherein the carbon particles comprise conductive carbon particles.

7. The product of claim 1, wherein the product further comprises a collector, and wherein the collector is attached to the at least one electrode film by the self-aligning adhesive.

8. The product of claim 1, wherein the product comprises a collector, and wherein the electrode film is adhesively self-aligned to the collector.

9. The product of claim 1, wherein the adhesive comprises a thermoplastic.

10. The product of claim 1, wherein the electrode film is at least 1 meter long.

11. The product of claim 1, wherein the electrode film is self-supporting.

12. The product of claim 1, wherein the product is a roll.

13. An electrode product, comprising:
    at least one electrode film comprising a dry blend of carbon and binder particles;
    an adhesive disposed onto the electrode film; and
    a collector,
    wherein the electrode film is adhesively self-aligned to the collector.

14. The product of claim 13, wherein the carbon particles comprise activated carbon particles.

15. The product of claim 13, wherein the binder particles comprise PTFE particles.

16. The product of claim 13, wherein the carbon particles comprise conductive carbon particles.

17. The product of claim 13, wherein the product further comprises a collector, and wherein the collector is attached to the at least one electrode film by the adhesive.

18. The product of claim 13, wherein the adhesive comprises a thermoplastic.

19. The product of claim 13, wherein the electrode film is at least 1 meter long.

20. The product of claim 13, wherein the electrode film is self-supporting.

21. The product of claim 13, wherein the product is a roll.

22. The product of claim 13, wherein the electrode film comprises a capacitor electrode film.

23. An electrode product, comprising:
    a self-supporting electrode film comprising a dry blend of carbon and binder particles; and
    an adhesive disposed onto the electrode film.

24. The product of claim 23, wherein the adhesive comprises a thermoplastic.

25. The product of claim 23, wherein the carbon particles comprise activated carbon particles.

26. The product of claim 23, wherein the binder particles comprise PTFE particles.

27. The product of claim 23, wherein the carbon particles comprise conductive carbon particles.

28. The product of claim 23, wherein the product further comprises a collector, and wherein the collector is attached to the at least one electrode film by the adhesive.

29. The product of claim 23, wherein the product comprises a collector, and wherein the electrode film is adhesively self-aligned to the collector.

30. The product of claim 23, wherein the electrode film is at least 1 meter long.

31. The product of claim 23, wherein the product is disposed on a roll.

32. The product of claim 23 wherein the electrode film comprises a capacitor electrode film.

* * * * *